United States Patent [19]
Reynolds et al.

[11] Patent Number: 5,319,533
[45] Date of Patent: Jun. 7, 1994

[54] POWER SELECTION AND PROTECTION CIRCUIT RESPONSIVE TO AN INPUT VOLTAGE FOR PROVIDING SERIES OR PARALLEL CONNECTED INVERTERS

[75] Inventors: Jon O. Reynolds, Appleton; Albert M. Nowak, DePere, both of Wis.

[73] Assignee: Miller Electric Mfg. Co., Appleton, Wis.

[21] Appl. No.: 822,370

[22] Filed: Jan. 17, 1992

[51] Int. Cl.$^5$ .............................................. B23K 9/10
[52] U.S. Cl. ................................. 363/17; 219/137 PS; 363/36; 363/143
[58] Field of Search ...................... 363/17, 28, 36, 71, 363/142, 143; 323/346; 219/137 PS

[56] References Cited

U.S. PATENT DOCUMENTS

| | | |
|---|---|---|
| 2,830,253 | 4/1958 | Sleeper, Jr. . |
| 2,997,631 | 8/1961 | Moakler ................................. 307/64 |
| 3,815,009 | 6/1974 | Berger ................................... 307/66 |
| 3,846,695 | 11/1974 | Genuit et al. . |
| 4,415,964 | 11/1983 | Scharfe, Jr. .......................... 363/142 |
| 4,540,892 | 9/1985 | Carvalho ............................... 307/130 |
| 4,564,742 | 1/1986 | Karlsson ............................ 219/130.1 |
| 4,608,498 | 8/1986 | Falzarano et al. .................... 307/22 |
| 4,608,500 | 8/1986 | Togawa ................................. 307/22 |
| 4,641,234 | 2/1987 | Bonal ................................... 363/124 |
| 4,780,805 | 10/1988 | Chewuk et al. ....................... 363/142 |
| 4,843,301 | 6/1989 | Belanger ............................... 323/299 |
| 4,845,607 | 7/1989 | Nakao et al. .......................... 363/49 |

FOREIGN PATENT DOCUMENTS 131272  10/1980  Japan ................................... 363/143

OTHER PUBLICATIONS

"Automatic Input-Selecting Power Circuit", IBM Tech. Discl. Bul., vol. 28, No. 3, pp. 1246-1247, Aug. 1985.

Primary Examiner—William H. Beha, Jr.
Attorney, Agent, or Firm—Foley & Lardner

[57] ABSTRACT

An inverter power supply for use with various voltage inputs is provided. The inverter power supply generally receives 208 VAC single-phase, 230 VAC three-phase, 230 VAC single-phase, 460 VAC single-phase, 208 VAC three-phrase or 460 VAC three-phase power and provides a DC output current for welding, heating or cutting applications. The power inverter circuit includes a first tank circuit and a second tank circuit which are configured in serial or parallel according to a particular voltage input. Contactors, relays, or semiconductor switches respond to control signals from an AC sense circuit in order to configure the inverter power supply for the appropriate voltage input.

29 Claims, 8 Drawing Sheets

POWER SELECTION AND PROTECTION CIRCUIT RESPONSIVE TO AN INPUT VOLTAGE FOR PROVIDING SERIES OR PARALLEL CONNECTED INVERTERS

BACKGROUND OF THE INVENTION

This invention generally relates to power supplies More particularly, this invention relates to inverter power supplies employed in welding, cutting and heating applications.

Power supplies typically convert a power input to a necessary or desirable power output tailored for a specific application. In welding applications, power supplies typically receive a high voltage alternating current (VAC) signal and provide a high current output welding signal. For example, welding power supplies can receive an input such as 208 VAC single-phase, 208 VAC three-phrase, 230 VAC single phase, 230 VAC three-phase, 460 VAC single-phase, or 460 VAC three-phase low current power to produce an approximately 10–40 VDC high current welding output.

Generally, a welding power supply is designed for a specific power input In other words, the power supply cannot provide essentially the same output over the various input powers. Further, components which operate safely at a particular input power level are often damaged when operating at an alternative input power level. Therefore, power supplies in the prior art have provided for these various inputs by employing circuits which can be manually adjusted to accommodate a variety of inputs. These circuits generally may be adjusted by changing the transformer turns ratio, changing the impedance of particular circuits in the power supply or arranging tank circuits to be in series or in parallel In these prior art devices, the operator was required to identify the voltage of the input and then manually adjust the circuit for the particular input.

Generally, adapting to the various voltage inputs in the prior art requires that the power supply be opened and cables be adjusted to accommodate the particular voltage input. Thus, the operator was required to manually link the power supply so that the appropriate output voltage was generated. Operating an improperly linked power supply could result in personal injury, power supply failure or insufficient power.

Prior art devices accommodated this problem by configuring the power supply to operate at two different VAC input levels For example, U.S. Pat. No. 4,845,607, issued to Nakao et al. on Jul. 4, 1989, discloses a power source which is equipped with voltage doubling circuits that are automatically activated when the input is on the order of 115 VAC, and which is deactivated when the input is on the order of 230 VAC. Such sources are designed to operate at the higher voltage level, with the voltage doubling circuit providing the required voltage when the input voltage is at the lower level. This type of source, which uses a voltage doubling circuit, must use transistors or switching devices as well as other components capable of withstanding impractical high power levels to implement the voltage doubling circuit Further, the circuitry associated with the voltage doubling circuit inherently involves heat dissipation problems Also, the voltage doubling circuit type of power supply is not fully effective for use in welding applications. Thus, there is a long felt need for a power supply for use in welding applications which can automatically be configured for various VAC input levels.

Welding power supplies are generally known which receive a high VAC signal and generate a high current DC signal. A particularly effective type of the power source for welding applications which avoids certain disadvantages of the voltage doubling circuit type of power supply generally relies on a high frequency power inverter. Inverter power sources convert high voltage DC power into high voltage AC power The AC power is provided to a transformer which produces a high current output. High frequency power inverters include semiconductor components which are susceptible to breakdown and poor performance over input voltage ranges.

Power inverters for use over input voltage ranges are generally known in the art. For example, a power inverter which is capable of using two input voltage levels is disclosed in U.S. Pat. No. 3,815,009, issued to Berger on Jun. 4, 1974. The power inverter of that patent utilizes two switching circuits; the two switching circuits are connected serially when connected to the higher input voltage, but are connected in parallel to account for the lower input voltage. The switching circuits are coupled to each other by means of lead wires This inverter is susceptible to operator errors in configuring the switching circuits for the appropriate voltage level, which can result in power source malfunction or human injury. Thus, there is a need for an inverter power supply which can be automatically configured for various voltage inputs.

SUMMARY OF THE INVENTION

The above disadvantages of an inverter power supply for a welding application may be minimized by providing a circuit to automatically link the power supply so it safely produces an operational output signal for any of a number of AC voltage inputs The device of the present invention advantageously includes a rectifier for receiving an AC voltage signal from a plurality of voltage types and generating a DC voltage, an inverter for converting the DC voltage into an AC voltage, and a configuration circuit for determining the voltage types received by the rectifier and arranging the inverter for the particular voltage type. Therefore, the device of the present invention advantageously provides an inverter power supply which automatically configures itself for various voltage inputs.

BRIEF DESCRIPTION OF THE DRAWINGS

A preferred exemplary embodiment of a power supply in accordance with the present invention will hereinafter be described in conjunction with the appended drawings wherein like designations denote like elements in the various figures, and.

DETAILED DESCRIPTION OF THE EXEMPLARY EMBODIMENTS OF THE INVENTION

Figure 1:
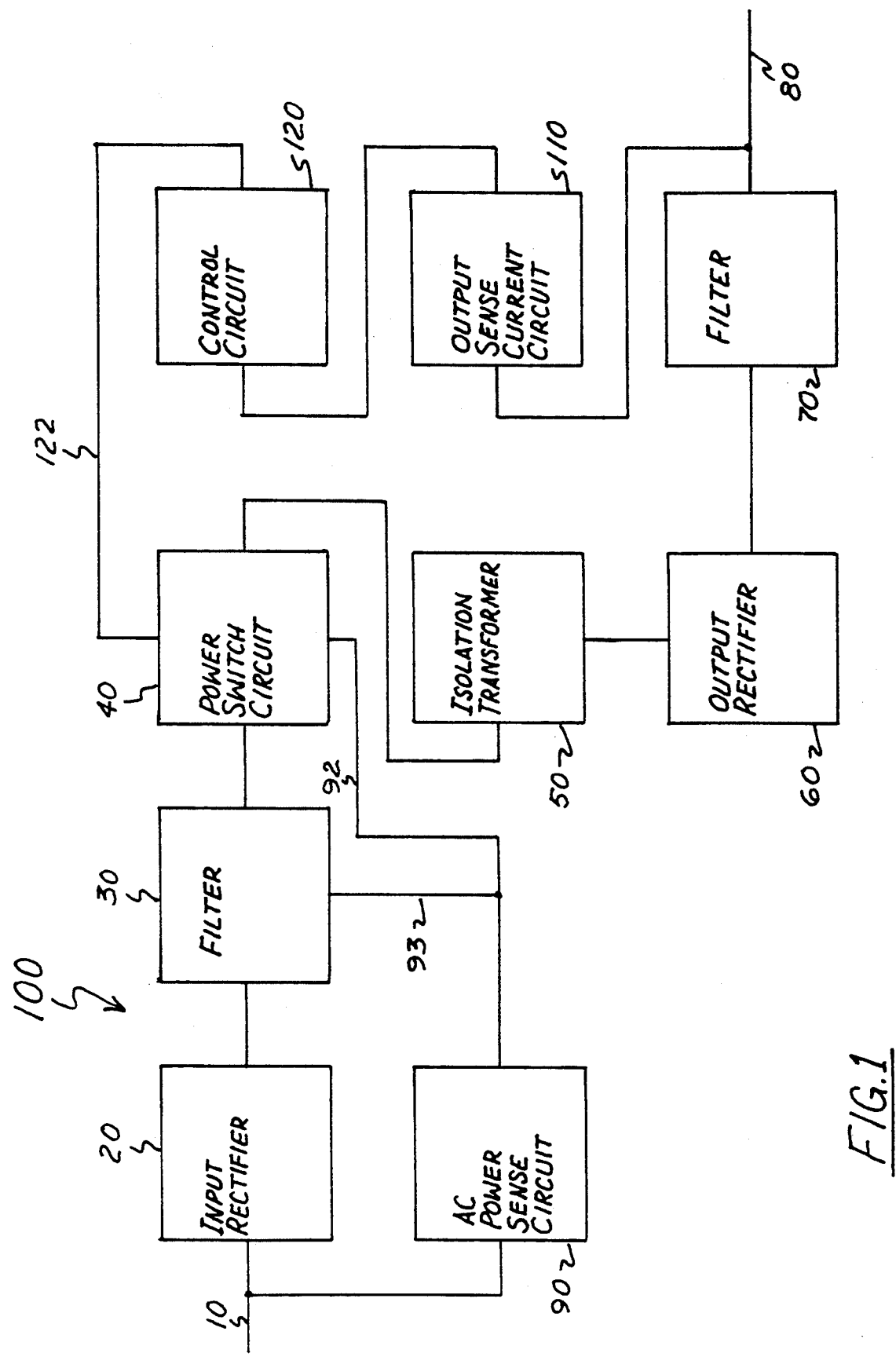
FIG. 1 is a block diagram of an exemplary embodiment of a power supply in accordance with the present invention.

With reference to FIG. 1, a power supply designated generally as 100 is adapted to transform a high VAC signal to a high current DC signal Power supply 100 is a special type of power converter referred to as an inverter-type power supply useful for welding, heating and cutting applications. Converters are a type of power device which receives an input and provides an output which is a different form of power. For instance, a DC-to-DC converter is a chopper; an AC-to-AC converter is an AC converter; and an AC-to-DC converter is a rectifier, while a DC-to-AC converter could properly be termed an inverter.

An inverter-type power source similar to power supply 100 involves four converters. The first converter is a rectifier which changes the AC input to a DC voltage. The second converter is an inverter which changes the DC voltage from the rectifier to a high frequency AC voltage. The third converter is an AC-to-AC converter which changes the relatively high voltage, low current AC voltage to a relatively low voltage, high current AC voltage. The fourth converter is another rectifier which changes the high frequency AC voltage back to a DC voltage. Thus, power supply 100 receives an AC input and generates a DC output.

Welding power supply 100 includes an AC input 10, an input rectifier 20, a filter 30, a power switch circuit 40, an isolation transformer 50, an output rectifier 60, a filter 70 and a DC output 80. Power supply 100 also includes an AC sense circuit 90, an output sense circuit 110, and a control circuit 120. Generally, AC sense circuit 90 determines the voltage at AC input 10. AC sense circuit 90 generates a control signal indicative of the voltage at AC input 10. Input rectifier 20 converts the VAC power at input 10 to DC power. Filter 30 eliminates ripple voltage associated with the DC power and provides storage for the DC power. Power switch circuit 40 converts the DC power to a relatively high voltage, low current AC signal Power switch circuit 40 also receives the control signal from sense circuit 90.

Power switch circuit 40 is configured for the appropriate voltage level at input 10 in response to the control signal Power switch circuit 40 generates the AC signal in response to control signals from control circuit 120. Isolation transformer 50 converts the relatively high voltage, low current VAC signal from circuit 40 to a relatively low voltage, high current VAC signal. Output rectifier 60 converts the relatively low voltage, high current VAC signal to a high current DC signal. Filter 70 eliminates ripple voltage and provides storage for the DC signal The DC signal is provided to DC output 80.

The operations of power supply 100 are generally described as follows An input voltage is provided at AC input 10 to power supply 100. The input voltage may be a 208 VAC single-phase, a 230 VAC single-phase, a 230 VAC three-phase, a 460 VAC single-phase input, or a 460 VAC three-phase input. AC input 10 is generally a three-phase input connector for power applications which are generally known in the art.

Sense circuit 90 determines the voltage level associated with input 10 and generates a control signal indicative of the voltage level. Sense circuit 91 is coupled to AC input 10 to determine the level of voltage associated with input 10. Generally, AC voltage sensor circuits are known in the art. Isolation sensor circuits such as transformers, opto-isolators, or magnetic coupling circuits are generally known in the art for sensing operation in AC power applications. Sense circuit 90 may even be comprised of a stepdown circuit such as a resistor network coupled to a bridge coupled to an A/D converter for providing a digital signal representative of the voltage to a digital control circuit. Preferably, sense circuit 90 is comprised of a control transformer coupled to a transistor circuit which produces control signals in response to the voltage level at the secondary of the control transformer. Sense circuit 90 is generally any circuit which produces a signal in response to a voltage level.

The signal at input 10 is rectified by input rectifier 20, and a DC voltage is provided to filter 30. The DC voltage provided by input rectifier 20 is related to the voltage level provided at input 10. For instance, if a 208 VAC single-phase voltage is provided to AC input 10, rectifier 20 provides an approximately 208V rectified DC signal within a particular tolerance. This signal is filtered by filter 30 and provided to power switch circuit 40.

Input rectifier 20 generally consists of rectifiers or diodes employed to convert an AC signal to a DC signal. Diode bridges, half wave rectifiers, rectifying SCR's, tubes, and other switching devices are suitable for this task. However, other semiconductor devices for rectifying an AC signal may be used. As is well known in the art, rectifier 20 may be any device which converts a high voltage AC signal to a high voltage DC signal.

Filter 30 stores DC power from rectifier 20. DC filter 30 is generally comprised of power capacitors. Filter 30 also includes resistor and inductor networks for tuning and smoothing operations. Filter 30 preferably reduces ripple voltages associated with rectifier 20.

Power switch circuit 40 receives the DC voltage from filter 30 and provides a high frequency AC signal to isolation transformer 50. The frequency at which power switch circuit 30 modulates is controlled by control circuit 120. The frequency is generally related to the current sensed at output 80 by output sense current circuit 110. Control circuit 120 may also vary the pulse width to control the power through power switch circuit 40. Various other methods for controlling the power through power switch circuit by means of control signals from circuit 120 are generally known in the art.

In a preferred embodiment, control circuit 120 generally varies the frequency between 25 to 100 KHz. Power switch circuit 40 operates at high frequency to take advantage of the drastically reduced transformer size which is possible when operating at high frequency Further, high frequency eliminates audible noise. Further still, high frequency provides faster response times and has better output performance. Nonetheless, switch circuit 40 may operate at various frequencies as long as an appropriate current is produced at output 80.

Power switch circuit 40 changes the DC voltage from filter 30 to an AC voltage by switching ON and OFF. Switching ON and OFF alternately connects and disconnects the power supplied from filter 30 and generates an AC signal, or a pulsing signal for isolation transformer 50. When switching circuit 40 is modulated ON and OFF, an AC signal travels through isolation transformer 50. Power switch circuit 40 is generally comprised of semiconductor switching devices for producing an AC signal in response to control signals at an input 122.

The components within filter 30 and switch circuit 40 are preferably arranged for the appropriate input by means of switches located within filter 30 and switch circuit 40. Switches within filter 30 and switch circuit 30 are preferably relay contractors or semiconductor switches The contractors or switches are controlled by signals from sense circuit 90.

In response to control signals provided at control links 92 and 93, the switching components within filter 30 and switch circuit 40 configure current paths through filter 30 and switch current 40 for the appropriate input. Switches within filter 30 and switch circuit 40 may configure the various components by bypassing particular circuit paths, adding particular circuit paths, or arranging particular circuits in serial or in parallel. Thus, filter 30 and switch circuit 40 are configured for the particular voltage at input 10 in response to the control signals at control links 92 and 93.

The AC signal from power switch circuit 40 is provided to isolation transformer 50. Isolation transformer 50 receives the relatively high voltage, low current, high frequency signal and generates a relatively low voltage, high current, high frequency signal The change from high voltage to high current is related to the turns ratio of transformer 50. Transformer 50 preferably is a step down transformer with a turns ratio of greater than 1 so that a lower voltage higher current signal may be produced Preferably, transformer 50 is a ferrite core transformer having air gaps in the core with a turns ratio of approximately 6 to 1. Isolation transformer 50 provides this high current signal to output rectifier 60.

Output rectifier 60 converts the high current AC signal to a high current DC signal Output rectifier 60 provides this high current DC signal to filter 70. Filter 70 filters the high current DC signal and provides a high current DC signal appropriate for various applications including welding, cutting, or heating at output 80.

Output rectifier 60 is preferably comprised of rectifiers, SCR's, semiconductor switches, or diodes coupled to the center tap of transformer 50 for full rectification. Alternatively, a full wave bridge or half-wave rectifiers may be employed at the secondary of transformer 50. Rectifiers used in output rectifier 60 are preferably power rectifiers for use with large current. As is well known in the art, output rectifier 60 may be comprised of any device or devices which convert a high current AC signal to a high current DC signal.

Filter 70 is preferably comprised of capacitor, inductor, and resistor networks employed for reducing ripple voltage and for storing power. The components in filter 70 are designed for high power applications.

The current at output 80 is sensed by output sense current circuit 110. Output sense current circuit 110 provides a signal representing the current at output 80 to control circuit 120. Circuit 110 is preferably a Hall effect sensor for determining the signal at output 80. Hall effect sensors provide a non-invasive current sense operation by determining the current from the magnetic field associated with output 80.

Control circuit 120 provides control signals at input 122 of power switch circuit 40. The control signal at input 122 reflects the current sensed at output 80, as well as other criteria. Control circuit 120 can also increase or decrease the power output by supply 100 in response to temperature, operating time, and input voltage. The control signal at inputs 122 control the switching criteria such as frequency or duty cycle within power switch circuit 40. The frequency and duty cycle affect the current provided at output 80.

Figure 2:
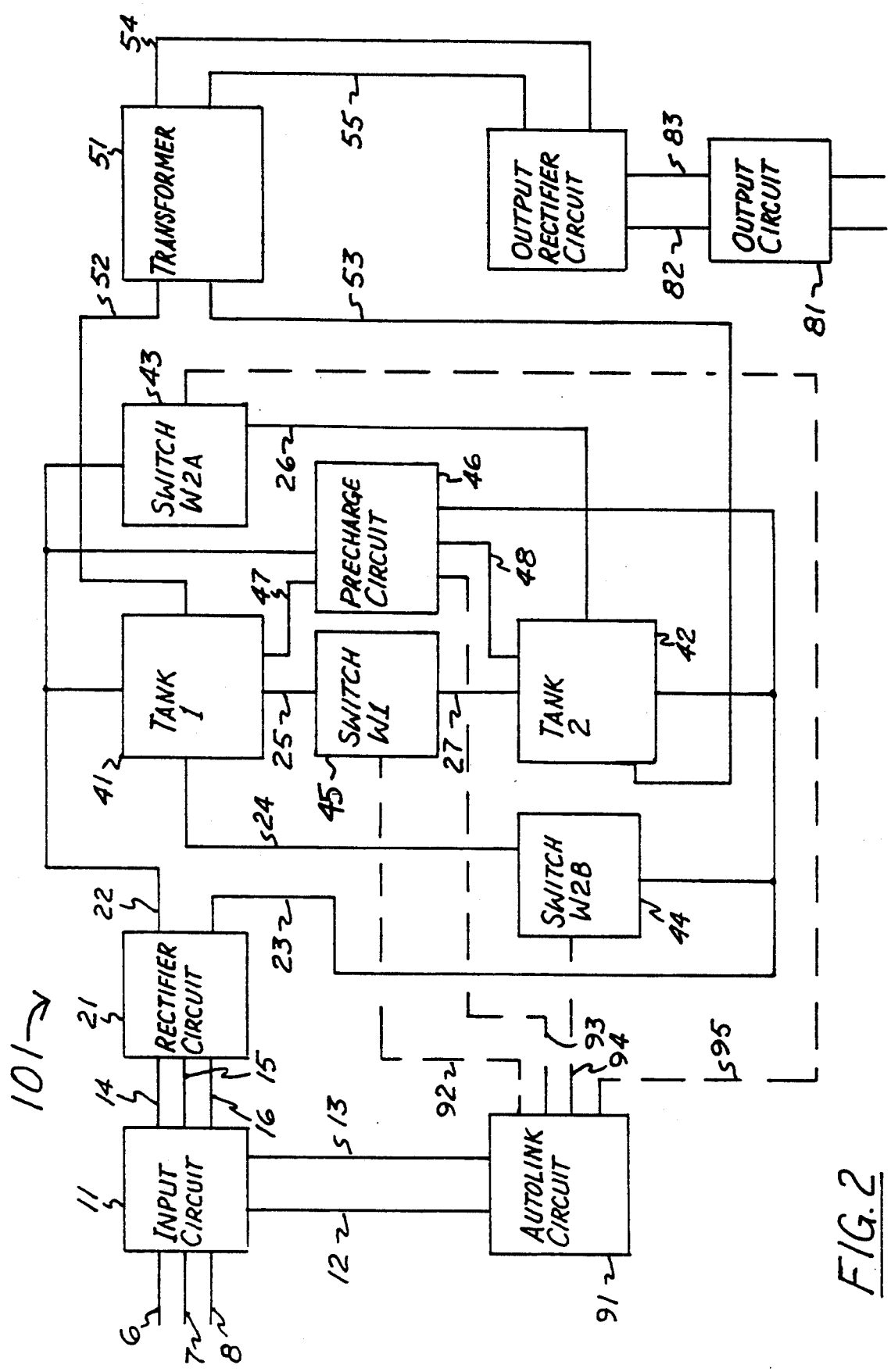
FIG. 2 is a detailed block diagram of an alternative exemplary embodiment of a power supply in accordance with the present invention.

With reference to FIG. 2, a more detailed simplified block diagram of an alternative preferred embodiment of a power inverter source circuit 101 for use with a power source suitable for welding, heating, or cutting applications. Power inverter source circuit 101 includes an input circuit 11, a rectifier circuit 21, an sense circuit 91, a tank one circuit 41, a tank two circuit 42, a transformer 51, an output rectifier circuit 61, and an output circuit 81. Circuit 101 also includes an input 6, an input 7, an input 8, a switch A 43, a switch A 44, a switch B 45, and a precharge circuit 46.

Power inverter source circuit 101 is configured for a high voltage input or a low voltage input. Circuits 41, 42 and 46 are configured via switch A 44, switch B 45, switch A 43, and switches within circuit 46. The interconnections of the various circuit elements within circuit 101 allow tank one circuit 41 and tank two circuit 42 to be configured in serial or in parallel according to a high voltage input, and a low voltage input, respectively. Sense circuit 91 is electro-magnetically coupled to switch B 45, switch A 43, switch A 44, and precharge circuit 46 for configuring tank one circuit 41, tank two circuit 42, and precharge circuit 46 for the high or low voltage input These interconnections are described as follows. Input circuit 11 is coupled to rectifier circuit 21 via a conductor 14, a conductor 15, and a conductor 16. Rectifier circuit 21 is coupled to tank one circuit 41, a first terminal of switch A 43 and precharge circuit 46 via a conductor 22. Rectified circuit 21 is also coupled to a second terminal of switch A 44, tank two circuit 42, and precharge circuit 46 via a conductor 23. Tank one circuit 41 is coupled to a first terminal of switch A 44 via a conductor 24. Tank one circuit 41 is also coupled to a first terminal of switch B 45 via a conductor 25.

Tank two circuit 42 is coupled to a second terminal of switch A 43 via a conductor 26. Tank two circuit 42 is also coupled to a second terminal switch B 45 via a conductor 27. Precharge circuit 46 is also coupled to tank one circuit 41 and tank two circuit 42 via conductors 47 and 48, respectively.

Sense circuit 91 is coupled to switch B 45 via a control link 92. Sense circuit 91 is coupled to precharge circuit 46 via a control link 93. Sense circuit 91 is coupled to switch A 44 via a control link 94. Sense circuit 91 is coupled to switch A 43 via a control link 95.

The operations of power inverter source circuit 101 is described in detail with respect to FIG. 2 as follows. Inputs 6, 7, and 8 allow three-phase or single-phase power of various voltage levels to be connected to input circuit 11. For example, inputs 6, 7 and 8 may be connected to 208 VAC single-phase power, single-phase 230 VAC power, 230 VAC three-phase power, 460 VAC single-phase power, or 460 VAC three-phase power. In an alternative embodiment, circuit 101 may be configured for a 575 VAC input.

The single-phase inputs should be connected across input 6 and input 7 so that sense circuit 91 receives the power signal. The first phase of the three-phase inputs is coupled to input 6; the second phase is coupled to input 7; and the third phase is coupled to input 8. Input circuit 11 provides the power at inputs 6 and 7 to sense circuit 91 via conductors 12 and 13. Input circuit 11 also provides power from input 6, 7 and 8 to rectifier circuit 21 via conductors 14, 15 and 16, respectively.

Rectifier circuit 21 provides a DC output at conductors 22 and 23. This DC power is provided to tank one circuit 41 and tank two circuit 42. The DC output across conductors 22 and 23 is related to the voltage provided at inputs 6, 7 and 8. If the signal provided at input 6, 7 and 8 is 230 VAC, rectifier circuit 21 provides a DC signal proportional to the 280 VAC input signal. If the signal provided at input 6, 7 and 8 is a 460 VAC signal, rectifier circuit 21 provides a DC signal proportional to the 460 VAC signal. Rectifier circuit 21 is similar to rectifier circuit 20. As is well known in the art, rectifier circuit 21 is generally comprised of power rectifiers for converting three-phase or single-phase AC power into DC power.

Tank one circuit 41 receives the DC power from conductor 22 and provides a pulsing signal or an AC power signal to transformer 51 via conductor 52. Tank two circuit 42 receives a DC power signal and provides a pulsing signal or an AC power signal to transformer 51 via conductor 53. Tank one circuit 41 and tank two circuit 42 are controlled by a control circuit (not shown) similar to circuit 120 in FIG. 1. In FIG. 2, the control circuit provides control signals for firing switches within circuits 41 and 42. These control signals provide various characteristics for the AC signal generated by circuits 41 and 42 including frequency so that the appropriate output is provided at output circuit 81.

Tank one circuit 41 and tank two circuit 42 are generally comprised of power switching circuit and power filter circuits. The power switching circuit is generally comprised of semiconductor devices like IGBT's or SCR's configured to produce a high frequency, high voltage signal in response to control signals from the control circuit. Generally, the switching circuits operate to provide a path through the primary of transformer 51. The power filter circuits generally provide power storage and filtering operations using power capacitors as well as other components.

Tank one circuit 41 and tank two circuit 42 are generally comprised of components arranged so that circuit 41 and circuit 42 are each able to withstand the voltage associated with ½ of the maximum level provided at input circuit 11. With this capability, tank one circuit 41 and tank two circuit 42 are able to withstand the maximum voltage when configured serially. However, various tank circuits could be provided which withstand various fractions of the maximum voltage levels. For example, a third tank circuit could be provided for withstanding greater VAC ranges.

Transformer 51 receives the AC signal from circuits 41 and 42 at conductors 52 and 53 and generates a high current output at conductors 54 and 55. Transformer 51 provides the high current signal to output rectifier circuit 61.

Output rectifier circuit 61 is generally comprised of rectifiers, tubes, or diodes. Preferably, circuit 61 includes semiconductor switching devices for high current applications such as diodes, SCR's, or transistors. Circuit 61 is and device which receives an AC high current signal or pulsing signal and provides a DC high current signal. Output rectifier circuit 61 provides a DC high current signal at an output 82 and an output 83 for output circuit 81. Output circuit 81 is preferably an interface for weld cables which are well known in the art.

The configuration or arrangement operations of circuit 101 are described as follows. Sense circuit 91 provides various control signals across links 92, 93, 94, and 95 for controlling switch B 45, precharge circuit 46, switch A 44, and switch A 43, respectively. Switches B 45, A 44, and A 43 are preferably relay switches with respective relay coils located within circuit 91. By providing power to the coils--within circuit 91, circuit 91 controls switches B 45, A 44, A 43, and precharge charge circuit 46 via links 92, 94, 95, and 93, respectively.

Sense circuit 91 generally determines the voltage at inputs 6 and 7 via conductors 12 and 13. As is known in the art, sense circuit 91 may be any circuit that is capable of sensing a voltage and providing an output in response to that voltage. Sense circuit 91 generates control signals indicative of the voltage at inputs 6 and 7. Preferably, circuit 91 produces a first control signal for a low voltage input when the voltage at inputs 6 and 7 is below a threshold signal and a second control signal when the voltage at inputs 6 and 7 is above a threshold level. In a preferred embodiment the threshold level is between 230 VAC and 460 VAC.

Circuit 91 transmits these signals across links 92, 93, 94 and 95 so that tank one circuit 41 and tank two circuit 42 are arranged serially for the high voltage level and in parallel for the low voltage level. Components within tank one circuit 41 and tank two circuit 42 are protected from high voltages by being arranged serially for the high voltage level. This arrangement also allows circuit 101 to produce an appropriate signal at output circuit 81 over the various voltage levels provided at inputs 6, 7 and 8.

Sense circuit 91 configures tank one circuit 41 and tank two circuit 42 for a 230 VAC input or a 460 VAC input whether three-phase or single-phase. Sense circuit 91 senses the voltage level at conductors 12 and 13 and provides appropriate signals through control links 92, 3, 94 and 95. Sense circuit 91 configures tank one circuit 41 and tank two circuit 42 by connecting 41 and 42 in or in parallel by means of switch A 44, switch A, 43 switch B 45.

Sense circuit 91 configures tank one circuit 41 and tank two circuit 42 for a 460 VAC input no matter which voltage level is coupled to input circuit 11 when circuit 101 is turned ON. By providing for the higher level voltage input, sense circuit 91 protects the various circuit components from damage from the high voltage level. Sense circuit 91 provides for the high voltage by connecting tank one circuit 41 and tank two circuit 42 serially. Tank one circuit 41 and tank two circuit 42 a connected serially by opening switch A 43 and switch A 44 and closing switch B 45. Therefore, tank one circuit 41 and tank two circuit 42 are connected serially between conductors 22 and 23 upon start-up.

When a 230 VAC input is provided across input 6, 7 and 8, sense circuit 91 reconfigures tank one circuit 41 and tank two circuit 42 in parallel. Tank one circuit 41 and tank two circuit 42 are provided in parallel so that the appropriate power is provided to the transformer 51 so that an appropriate output is provided at output circuit 81. Tank one circuit 41 and tank two circuit 42 are connected in parallel by closing switch A 43 and A 44 and opening switch B 45. Switch A 43 and switch A 44 are closed via control links 95 and 93, respectively.

Circuit 91 also controls precharge circuit 46. Precharge circuit 46 protects the various components in circuits 41 and 42 by providing a pre-charging path when circuit 101 is turned ON. Precharge circuit 46 protects the various components from in rush current and voltage spikes upon circuit 101 start-up. Circuit 91 arranges precharge circuit 46 in parallel with tank one circuit 41 and tank two circuit 42 for the low voltage input and in series with circuits 41 and 42 for the high voltage input. This arrangement allows the capacitors within circuits 41 and 42 to charge up to the appropriate voltage level safely.

Circuit 91 also engages precharge circuit such as a circuitry 41 for an appropriate amount of time as components in source circuit 101 are charged upon start-up After the components in inverter source circuit 101 have been charged up, circuit 91 disengages or bypasses precharge circuit 91. Circuit 91 preferably bypasses circuit 46 after a predetermined time has elapsed. The predetermined time is long enough so that the components in circuit 101 are allowed to precharge through circuit 46. Alternatively, circuit 91 could measure the voltage associated with circuits 41 and 42 to determine whether circuits 41 and 42 have been precharged and provide the appropriate control signal in accordance with that measurement.

When circuit 101 is turned ON, sense circuit 91 provides a signal across control link 93 to precharge circuit 46. Precharge circuit 46 is configured for the appropriate voltage level via the signal from control link 93.

Figure 3:
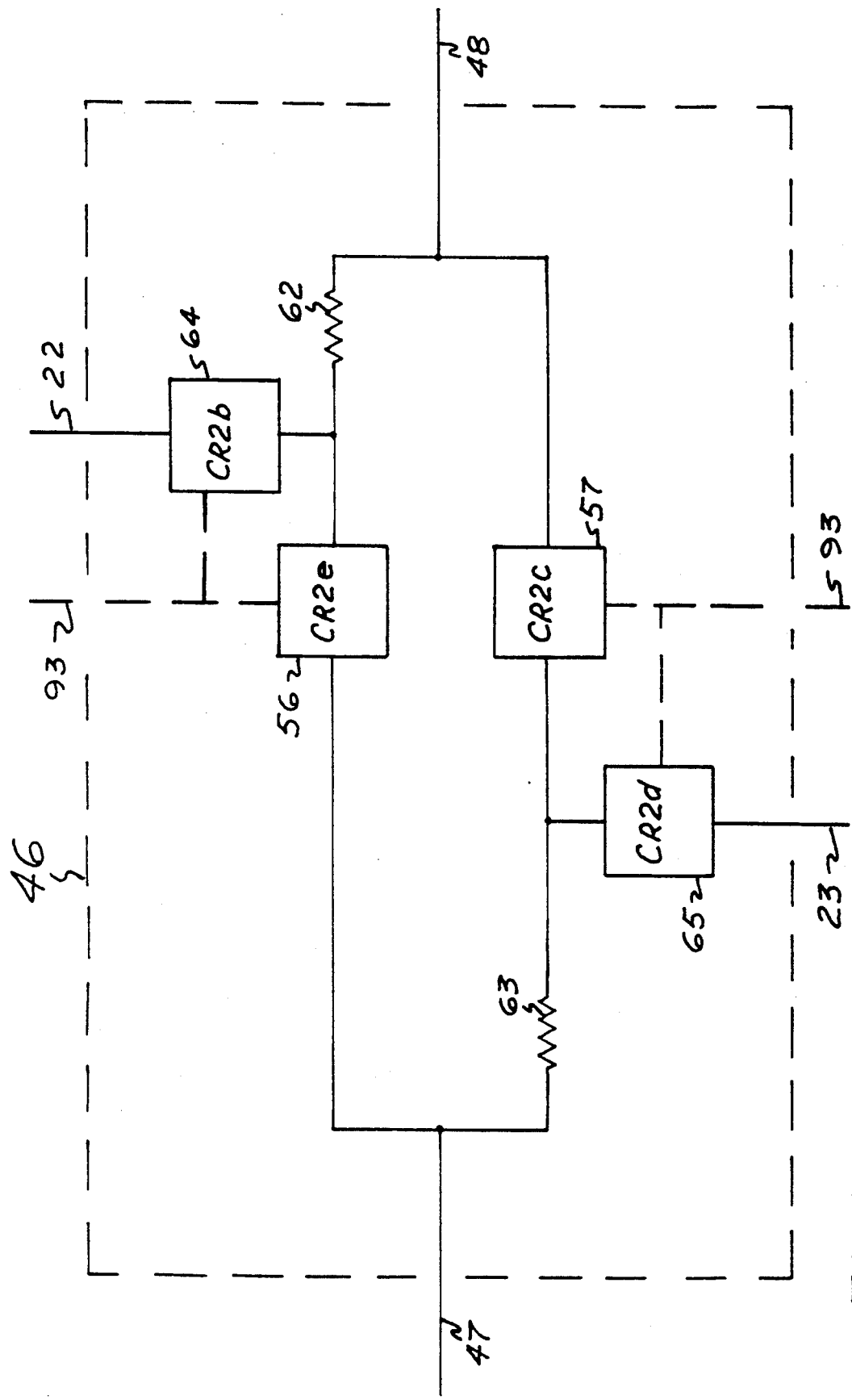
FIG. 3 is a block diagram of a precharge circuit in accordance with an embodiment of the present invention.

With reference to FIG. 3, precharge circuit 46 includes a resistor 62, a resistor 63, a switch C 64, a switch C 56, a switch C 57 and a switch C 65. Switches C 64, C 56, C 57, and C 65 precharge circuit 46 to be configured for a high voltage level or a low voltage level. Switches C 64, C 56, C 57, and C 65 are preferably relay switches controlled by link 93. Switches C 64, C 56, C 65 and C 57 are electro-magnetically coupled to control link 93.

The operations of precharge circuit 46 are described as follows with reference to FIGS. 2 and 3. Precharge circuit 46 provides protection to various filters and other components in tank one circuit 41 and tank two circuit 42 by providing current limiting devices as the various components are charging after circuit 101 is turned ON. Resistors 62 and 63 are power resistors which act as current limiting devices. When circuit 101 is turned ON, switch C 56 and switch C 57 are closed and switch C 64 and C 65 are opened. Therefore, conductors 47 and 48 are coupled to each other through resistors 62 and 63. Thus, resistors 62 and 63 are in parallel. This is the appropriate configuration for precharge circuit 245 for the high voltage level. Circuit 91 always configures precharge circuit 245 for the high voltage level upon start-up so that components are not damaged when the high voltage level is connected at start-up.

A resistive path from conductor 47 to conductor 48 through resistors 62 and 63 is the appropriate configuration for precharge circuit 46 for the high voltage level. When 460 VAC is connected at input 6, 7 and 8, precharge circuit 46 provides resistance between conductors 47 and 48. After a brief period of time, switch B 45 is closed so that tank one circuit 41 and tank two circuit 42 are connected in series. When switch B 45 is closed, precharge circuit 46 is bypassed. Switch B 45 is controlled by circuit 91 via link 92.

When 230 VAC is connected at input 6, 7 and 8, switch C 56 and C 57 are closed after a brief period of time providing a path between conductors 47 and 48 across resistors 62 and 63. Precharge circuit 46 is configured for the high voltage level upon start-up. After a brief period of time, switch C 56 and C 57 are opened and switches C 64 and C 65 are closed simultaneously.

With this configuration, two precharge paths are provided. A first precharge path is provided for tank one circuit 41 through conductor 47, resistor 63, switch C 65, and conductor 23. A second path is provided for tank two circuit 42 through conductor 22, switch C 64, resistor 62 and conductor 48 so that circuits 41 and 42 appropriately precharge. After the 230 VAC input is connected for a period of time, switch A 43 and switch A 44 are closed and precharge circuit 46 is bypassed Therefore, precharge circuit 46 is capable of being configured in two modes. A first mode for the 460 VAC input and a second mode for the 230 VAC input. With this arrangement, circuits 41 and 42 may safely precharge to the appropriate voltage level for each voltage level.

Figure 4:
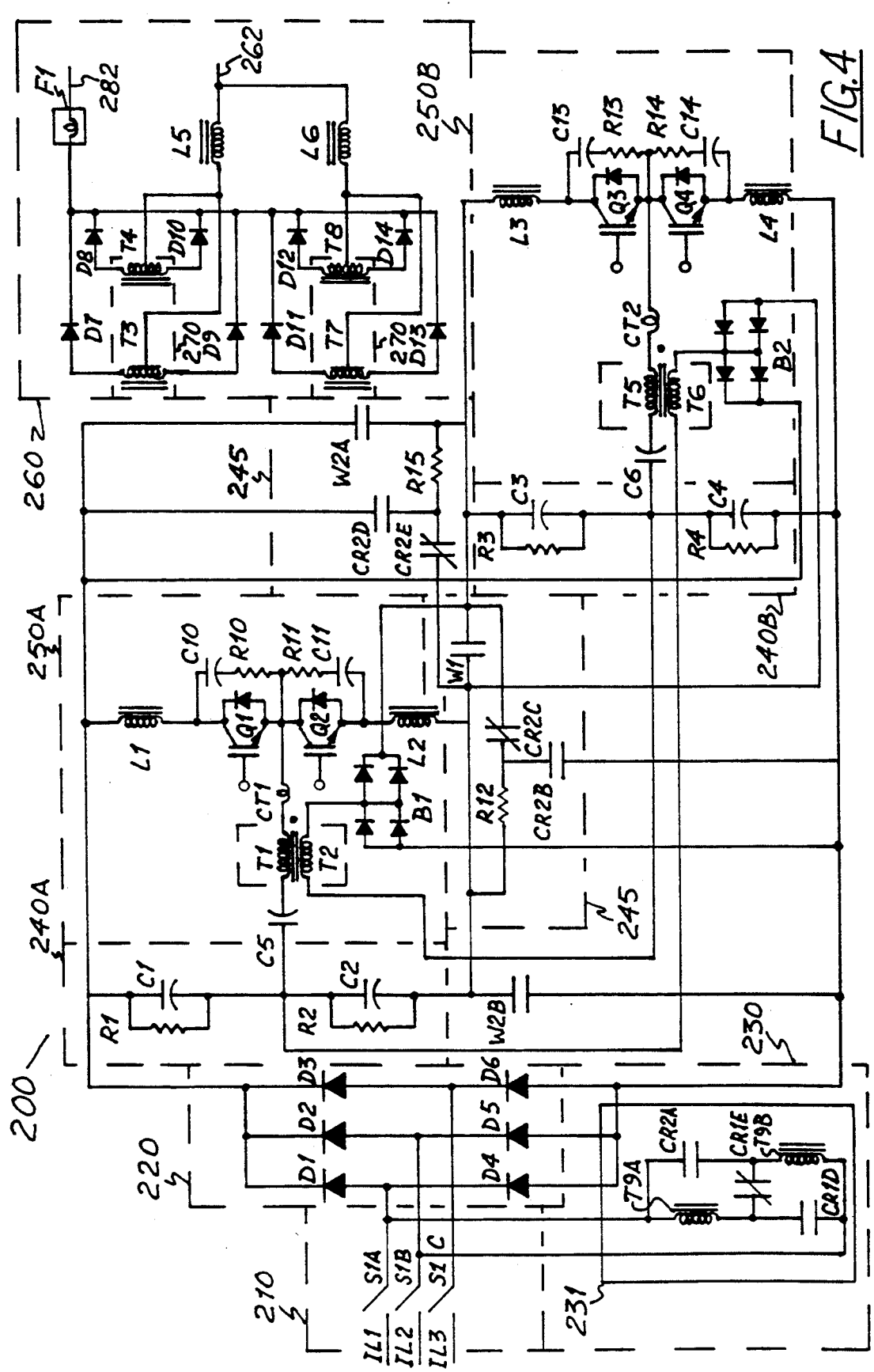
FIG. 4 is a schematic drawing of a power source in accordance with a preferred embodiment of the present invention.
Figure 5:
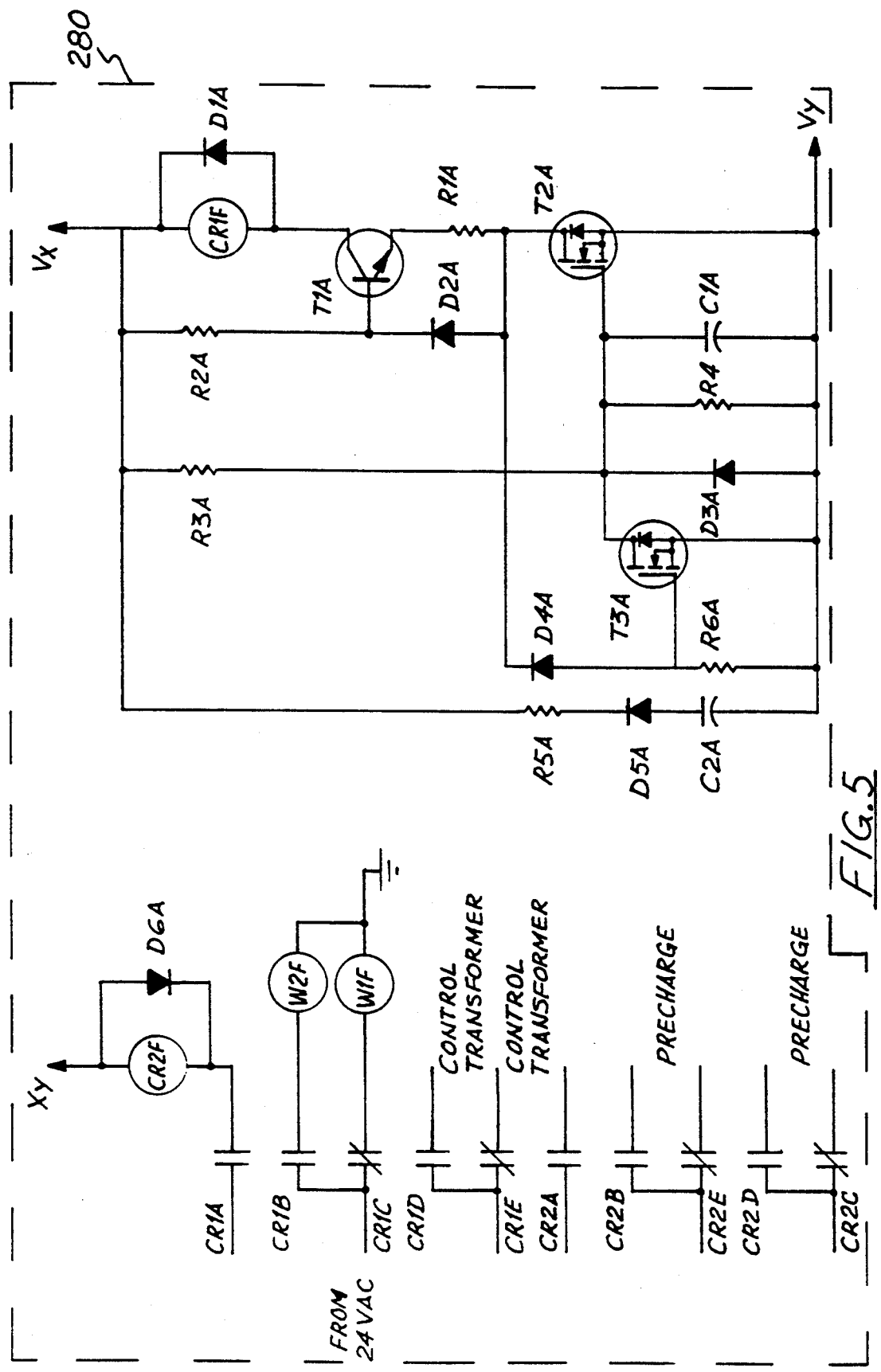
FIG. 5 is a schematic drawing of a power sense circuit in accordance with an exemplary embodiment of the present invention.

With reference to FIGS. 4 and 5, a more detailed schematic of an alternative embodiment of an inverter power source 200 similar to power supply 100 and power inverter source circuit 101 includes an input 210, a rectifier 220, a filter 240A, a filter 240B, a switching circuit 250A, a switching circuit 250B, an isolation transformer 270, an output rectifier 260, a power supply 235, a control transformer circuit 230, a precharge circuit 245, and an AC power sense circuit 280. The part numbers and various values for the components of power source 200 are located in Table 1.

With reference to FIG. 4, the general operation of power inverter source 200 is described as follows. The source 200 is connected to an AC power source at input 210. Input 210 includes an input IL1, an input IL2 and an input IL3 which are connected to an AC power source. In order to operate source 200, switch S1A, switch S1B, and switch S1C are closed. The signals from inputs IL1, IL2, and IL3 travel across switches S1A, S1B, and S1C to rectifier 220. Switches S1A, S1B, and S1C are preferably combined in a triple pole single throw switch.

Rectifier 220 rectifies the signals at inputs IL1, IL2 and IL3. A diode D1, a diode D2, a diode D3, a diode D4, a diode D5 and a diode D6 are power rectifiers, and arranged as a three-phase bridge. Preferably, diodes D1, D2, D3, D4, D5, and D6 are included on a rectifier module. As is well known in the art, diodes D1, D2, D3, D4, D5 and D6 may be diodes, SCR's, tubes, or any other rectifying component. As is well known in the art, rectifier 220 may be comprised of any circuit device which converts a VAC signal to a voltage DC signal. Diodes D1, D2, D3, D4, D5 and D6 are arranged in two sets; the first set of diodes D1, D2, and D3 have cathodes coupled together and the second of diodes D4, D5 and D6 have anodes coupled together The two sets provide full-wave rectification for VAC three-phase inputs. Diodes D1, D2, D4 and D5 provide a full-wave bridge for a single-phase input at inputs IL1 and IL2. With a single-phase input, DC power is provided between cathodes of diodes D1 and D2, an d the anodes of D4 and D5, to various circuits within source 200.

The rectified signal from rectifier 220 is provided to a filter 240A and switching circuit 250A. A capacitor C1 and a capacitor C2 filter and store energy for switching circuit 250A. Capacitor C1 and capacitor C2 are generally DC electrolytic power capacitors capable of withstanding 250 VDC.

Also, filter 240B and switching circuit 250B are coupled to rectifier 220 to receive the wave rectified signal from rectifier 220. Filter 240B includes a capacitor C3 and a capacitor C4 for filtering and storing energy for use by switching circuit 250B. Capacitors C3 and C4 are generally DC electrolytic power capacitors capable of withstanding 250 VDC. Resistors R1, R2, R3 and R4 provide bleeding operations for filters 240A and 240B. Specifically, resistors R1, R2, R3 and R4 operate to balance the voltage across capacitors C1, C2, C3 and C4 as well as provide a safe discharge path when source 200 is turned off. The resistor and capacitor networks are tuned with respect to the inductance and capacitance associated with transformer 270 and switching circuits 250A and 250B.

Switching circuits 250A and 250B are coupled to filters 240A and 240B, respectively. Switching circuit 250A provides a high frequency AC signal to a primary coil T1 of transformer 270. The high frequency AC signal is controlled by gate inputs on a IGBT 251. IGBT 251 is a high power semiconductor switching device which is known in the art. A capacitor C10, a resistor R10, a capacitor C11, a resistor R11, and an inductor L2 are employed to store power and tune circuit 250A. A capacitor C5 provides filtering and tuning operations for primary coil T1 and inductors L1 and L2.

A transistor Q1 and a transistor Q2 internal to IGBT 251 are turned ON and OFF so that current travels through primary coil T1. Thus, the AC signal from switching circuit 250A is provided through a current transformer CT1 to primary coil T1. Current transformer CT1 generates a signal indicative of the amount of current traveling through primary coil T1 for the control circuit.

Specifically, when transistor Q1 is turned ON, current travels from the cathode of diode D3 through inductor L1, transistor Q1, primary coil T1, and into capacitor C5. The current through inductor L1 increases until the voltage across capacitor C5 is approximately equal to the voltage across capacitor C1. When the voltages are equal, the current is at a maximum value. The current decreases until there is approximately no current through inductor L1. When there is no current, the voltage across capacitor C5 is approximately two times the voltage across capacitor C1.

When the voltage across capacitor C5 is two times the voltage across capacitor C1, the diode associated with transistor Q1 conducts and the current reverses through inductor L1. At this time, the control circuit (not shown) may turn transistor Q2 ON or allow the current to come to rest and then turn transistor Q2 ON.

When transistor Q2 is turned ON, the charge on capacitor C5 is reversed. Current travels from capacitor C5, through primary coil T1, transistor Q2, and inductor L2 and to capacitor C2. The current through inductor L2 increases until the voltage across capacitor C5 is approximately equal to the voltage across capacitor C2. When the voltages are equal, the current is at a maximum. The current decreases until it reaches approximately zero. When the current reaches zero, the voltage across capacitor C5 is approximately two times the voltage across capacitor C2.

When the voltage across capacitor C5 is approximately two times the voltage across capacitor C2, the diode associated with transistor conducts and the current reverses through inductor L2. At this time, the control circuit (not shown) may turn transistor Q1 ON or allow the current to come to rest and then turn transistor Q1 ON. Current through primary coil T1 produces a high current AC signal at a secondary coil T3 and a secondary coil T4.

Switching circuit 250B provides a high frequency AC signal to a primary coil T5 of transformer 270. The high frequency AC signal is controlled by gate inputs on IGBT 252. IGBT 252 is a high power semiconductor switching device which is known in the art. Inductors L3 and L4 and capacitors C13 and C14, and resistors R13 and R14 provided to store power and tune switching circuit 250B. Resistors R10, R11, R12 and R14 are generally known as snubber resistors. A capacitor C6 provides filtering and tuning operations for primary coil T5 and inductors L3 and L4. Capacitors C5 and C6 are generally known as tank capacitors.

A transistor Q3 and a transistor Q4 internal to IGBT 252 are turned ON and OFF so that current travels through primary T5. Thus, the AC signal from switching circuit 250B is provided through current transformer CT2 to primary coil T5. Current transformer CT2 generates a signal indicative of the amount of current traveling through primary coil T5 for the control circuit IGBT's 251 and 252 include flyback diodes associated with transistors Q1, Q2, Q3, and Q4 internal to the device for dissipating energy associated with the current in transformer 270.

The components within circuit 250B operate similarly to switching circuit 250A for producing an AC signal through primary coil T5. A control circuit (not shown) turns ON transistors Q1 and Q3 synchronously and turns ON transistors Q2 and Q4 synchronously. Current through primary coil T5 produces a high current AC signal at a secondary coil T7 and a secondary coil T8. Thus, switching circuits 250A and 250B interact to send current through primary coils T1 and T5.

The high voltage, relatively low current signal provided to primary coils T1 and T5 of transformer 270 are converted to a relatively low voltage, high current AC signal at secondary coils T3, T4, T7 and T8. Transformer 270 is preferably a ferrite coil transformer having air gaps with primary coils T1 and T5, and secondary coils T3, T4, T7 and T8. Preferably, secondary coils T3, T4, T7 and T8 have a center tap. Transformer 270 also includes a spillover winding T6 and a spillover winding T2.

Transformer 270 has a 3-to-1 transformer ratio when coils T1 and T5 are in parallel and coils T3, T4, T7, and T8 are in parallel The relatively high current VAC signal produced at secondary coils T3, T4, T7 and T8 of transformer 270 are rectified by rectifier 260.

Rectifier 260 includes a diode D7, a diode D8, a diode D9, a diode D10, a diode D11, a diode D12, a diode D13, and a diode D14, employed to rectify the high current DC signal. Diodes D7, D8, D9, D10, D11, D12, D13 and D14 may be replaced by SCR's, tubes, or any rectifying component capable of handling high current applications. Rectifier 260 employs diodes D7, D8, D9, D10, D11, D12, D13 and D14 with the center taps of coils T3, T4, T7 and T8 to full-wave rectify the signal from transformer 270. Rectifier circuit 260 also includes an inductor L5 and an inductor L6 to provide filtering and tuning operations for source 200. A sensor FI is also coupled to an output 368 to provide output sensing operations. Sensor F1 is generally a Hall effect sensor produced by LEM Company. Rectifier 260 provides a high current DC signal at an output 262 and output 268.

A bridge B1 is employed with a spillover winding T2 to provide cross coupling between primary coil T1 and primary coil T5. Also, a bridge B2 is also provided with a spillover winding T6 to provide cross coupling between primary coil T1 and primary coil T5. Spillover windings T2 and T6 prevent the first tank from providing more power than the second tank. The spillover windings T2 and T6 also prevent the second tank from providing more power than the first tank.

When more power is provided by the first tank, current travels through spillover winding T6 and into bridge B2. Bridge B2 produces a direct current is fed to the cathode of diode D3 or the anode of diode D6 depending upon which mode the source 200 is operating. Similarly, spillover winding T2 current is traveling through primary coil T5. Bridge B1 produces a signal which is fed to the anode of diode D6 or the cathode of diode D3 depending upon which mode the source 200 is operating.

The operation of power source 200 with respect to various voltage inputs is described with reference to FIGS. 4, 5, and 6 as follows. Control transformer circuit 230 and AC power sense circuit 280 interact to determine the voltage level at input 210 and to produce appropriate control signals so that a contactor CR1, a contactor CR2, a contactor W1 and a contactor W2 properly link switching circuits 250A and 250B and filters 240A and 240B. Generally, control transformer 231 provides an output at a secondary coil T9C and a secondary coil T9D. Power sense circuit 280 receives signals at coils T9C and T9D and produces control signals in response to the voltage level at coils T9C and T9D. These control signals are provided to a coil CR1F, a coil CR2F, a coil W2F and a coil W1F.

All CR1 contractors are controlled by coil CR1F; all CR2 contractors are controlled by coil CR2F; all W2 contactors are controlled by coil W2F; and contactor W1 is controlled by coil W1F. Contactors W2A, W2B, and W1 are normally open contactors. Contactor W1 is controlled by a coil W1F, and contactors W2A and W2B are controlled by a coil W2F. Contactor W1 and contactors W2A and W2B are electromagnetically coupled to coil W1F and W2F, respectively. Contactors CR2 and CR1 are generally relay switches, and contactors W1 and W2 are preferably power contactors.

Control transformer 231 is configured to receive the signal between switch S1A and switch S1B. With switches S1A and S1B closed, one signal between input IL1 and IL2 is applied across a primary coil T9A and a primary coil T9B.

At start-up with switches S1A, S1B, and S1C closed, or when source 200 is turned ON, coil CR1F is de-energized and a contactor CR1E is closed. Contactor CR1E is a normally closed contactor. With contactor CR1E closed, primary coil T9A and primary coil T9B are serially connected. The use of a normally closed contactor for contactor CR1E ensures that when the source 200 is turned ON, control transformer 231 is configured for the highest intended input voltage.

As an example, source 200 is designed to generally accept 230 and 460 VAC inputs. In a preferred embodiment, the highest intended input voltage is 460 VAC. Contactor CR1E ensures that primary coils T9A and T9B remain serially connected as the input power is first applied. A contactor CR2A and a contactor CR2B are normally open contactors and remain open when coil CR2F is not energized.

Figure 6:
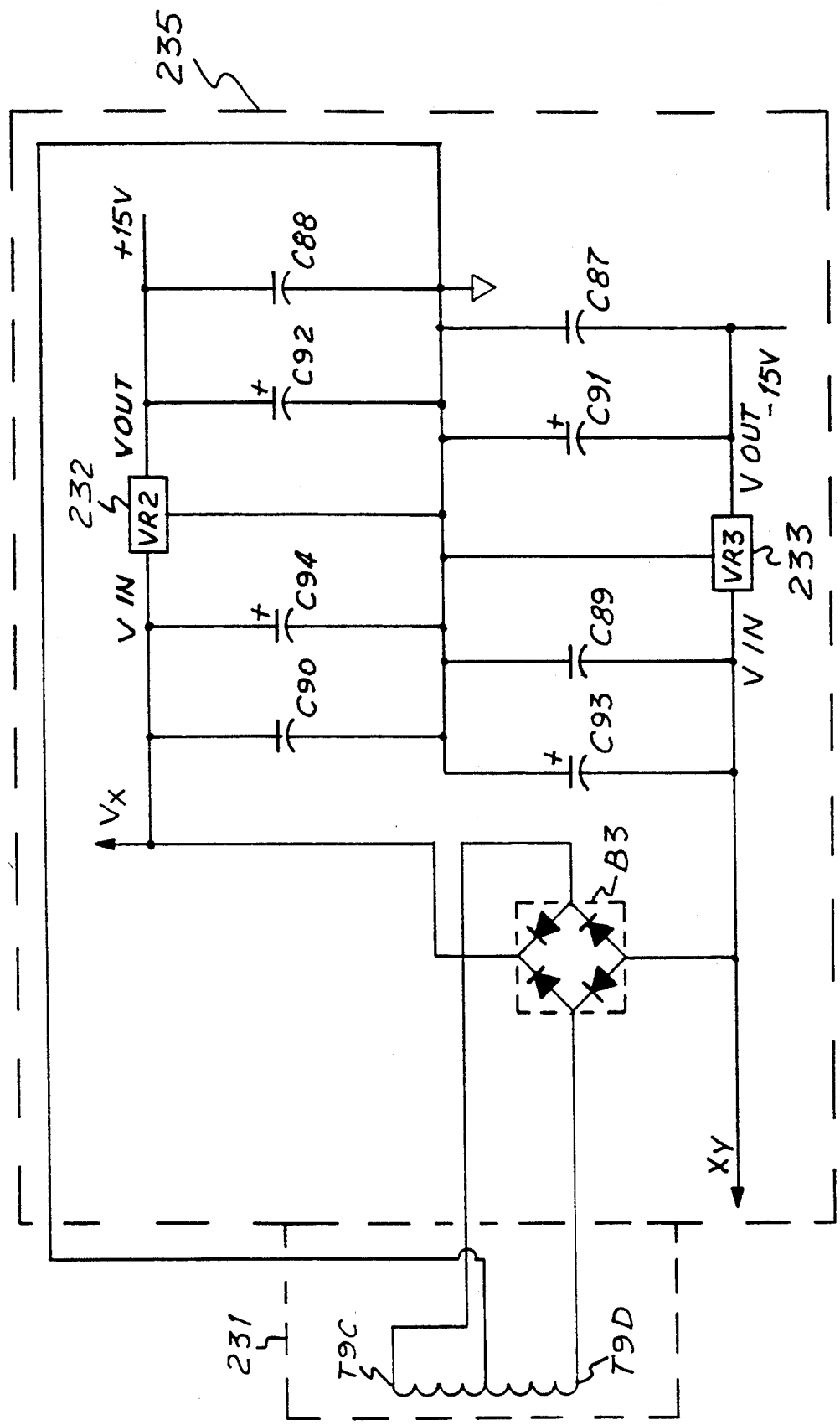
FIG. 6 is a schematic drawing of an AC to DC power supply used in a power sense circuit.

With reference to FIG. 6, control transformer 231 is configured to provide an +18 VAC signal in between the center tap and a first terminal of secondary T9C and a −18 VAC signal between the first terminal of secondary T9D and the center tap. Therefore, control transformer 231 is a stepdown transformer with a turns ratio of approximately 12 when primary coils T9A and T9B are in series. The signal between the first terminal of secondary T9C and the first terminal of secondary T9D is rectified by bridge B3. Regulator 232 is a DC regulator including filtering capacitors which provide a +15 VDC signal to other circuit components in response to a +18 root mean square (RMS) VAC full wave rectified signal. Regulator 233 is a DC regulator including filtering capacitors which provides a −15 VDC signal for other circuit components in response to a −18 RMS full wave rectified signal.

Preferably, control transformer 231 contains two secondary windings such as secondary T9C and secondary T9D. A center tap is formed by coupling a second terminal of secondary T9C and a second terminal of secondary T9D. The center tap is a ground signal for regulators 232 and 233. When a 18 VAC RMS signal is output by the first terminal of secondary coil T9C and a 18 VAC RMS signal is output by the first terminal of secondary T9D, bridge B3 provides a 48 VDC signal between signals VX and VY.

Input 210 can accept either three-phase or single-phase inputs. If a single-phase input is used, the power is connected between IL1 and IL2. If a single-phase input is used, the voltage difference between inputs IL1 and IL2 is equal to the single-phase voltage. If a three-phase input is used, the three phases of power are connected at input IL1, input IL2, and input IL3. When a three-phase input is used, the voltage across L1 and L2 is equal to the difference between the voltages at L1 and L2. Generally, the three-phase inputs are line-to-line voltages. Therefore, when a 230 VAC three-phase input is used, the signal across L1 and L2 is a 230 VAC. If a three-phase 460 volt AC signal is connected to inputs L1, L2 and L3, a 460 VAC signal is across the second terminal of switch S1A and switch S1B.

When a 460 VAC single-phase, or 460 VAC three-phase is connected to input 210, a voltage of greater than 320 VAC is across primary coil T9A and primary T9B of control transformer 231. Control transformer 231 steps down the voltage for power supply 235. When a voltage of greater than 320 volts is placed across primary coil T9A and primary coil T9B in series, power supply 235 generates a positive 24 VDC signal plus or minus 10% at an output VX and a negative 24 VDC signal plus or minus 10% at an output VY. Power supply 235 is an AC to DC power supply as is well known in the art. The value of 320 VAC was selected to distinguish between the 230 and 460 VAC inputs plus or minus a reasonable tolerance.

With output VX equal to +24 VDC and output VY equal to −24 VDC, a total of 48 volts is applied across sense circuit 280. With 48 volts across a resistor R5A, a diode D5A, and a capacitor C2A current flows across resistor R5A, diode D5A and charges capacitor C2A. Zener diode D5A blocks 30 VDC and the remaining 18 VDC is applied to the gate of transistor T3A. The RC time constant of the network including resistor R5A, diode D5A, and capacitor C2A is approximately 0.02 seconds. Therefore, when 48 volts is applied between output VX and output VY, capacitor C2A charges up relatively quickly. When the gate of a transistor T3A is biased to approximately 4 to 5V with respect to the source, transistor T3A is turned ON so that the negative 24 volt DC signal from output VY is applied to the gate of a transistor T2A. Transistor T2A is maintained OFF because the voltage between the gate of transistor T2A and the source of transistor T2A is almost 0.

When 48 volts is across output VX and output VY, transistor T2A is also not turned ON. The RC time constant at the gate of transistor T2A is much longer than the time constant at the gate of T3A. The time constant at the gate of transistor T2A is approximately 0.5 seconds. This time constant is established by the network consisting of resistor R3 and capacitor C1. Because this time constant is substantially longer than the time constant associated with the gate of transistor 3A, transistor T3A turns ON before transistor T2A and the gate of transistor T2A does not reach a great enough voltage to be turned ON.

When transistor T3A switches ON, the gate of transistor T2A is connected to the source of transistor T3A. With the gate of transistor T2A coupled to the source of transistor T3A (signal VY), transistor T2A is maintained in the OFF condition. A transistor T1A is then maintained in the OFF condition because transistor T2A controls the path including a diode D2A and a resistor R2A. When transistor T2A is OFF, current does not travel through either diode D2A or transistor T1A. When transistor T1A is OFF, no current travels through contactor coil CR1F.

When current does not travel through contactor coil CR1F, contactor CR1C remains closed. Contactor CR1C provides a path for the current to travel from signal 282 through coil W1F to ground. Contactor CR1C is a normally closed contactor. Signal 282 is provided by the control circuit (not shown in FIGS. 4 or 5). Signal 282 provides a zero volt signal for a "precharge" time after source 200 is turned ON. After that time has elapsed, signal 282 provides current for either coil W1F or W2F. A time delay circuit is used to prevent either coil W1F or W2F from energizing immediately when the power is switched ON. Thus, signal 282 does not provide power to coils W1 and W2F until the time delay has passed so that the precharge circuit 245 is not bypassed until the components within circuits 240A, 240B, 250A, and 250B are precharged.

Also, upon start-up, coils CR1F and CR2F are also de-energized. With contactors W1 and W2 opened, the current travels across resistors R12 and R15 of precharge circuit 245. The time delay prevents capacitors associated with the tank circuits from charging too quickly. The capacitors are charged through precharge circuit 245. Circuit 245 minimizes the in-rush current.

When coil W1F is energized, switching circuits 250A and 250B are arranged serially for a 460 VAC signal at input 210. With contactor W1 closed, precharge circuit 245 is bypassed.

When a voltage of less than 320 volts is provided between the second terminal switch S1A and S1B, circuit 280 configures source 200 for the lower voltage input. When a 230 VAC signal is applied at inputs L1 and L2, secondary coils T9C and T9D provide approximately 9 VAC signal each. Therefore, power supply 235 produces +12 volts DC plus or minus 10% at output VX and −12 volts DC plus or minus 10% at output VY. This condition applies approximately 24 volts across sense circuit 280.

Zener diode D5A prevents transistor T3A from turning ON. Diode D5A blocks 30 volts before allowing significant current through the network including resistor R5A, diode D5A and capacitor C2A. When 24 volts is applied across resistor R5A, diode D5A, and capacitor C2A, diode D5A only allows minimal current. Thus, capacitor C2A is not charged up to an appropriate voltage level and does not turn transistor T3A ON.

The 24 VDC applied between output VX and VY causes current to travel through a resistor R3A, a resistor C4A, and a capacitor C1A. Capacitor C1A is thus to approximately 12 volts higher than the voltage at the source of transistor T2A. When the gate of transistor T2A is biased to approximately 4 to 5V with respect to the source, transistor T2A is turned ON. When transistor T2A is turned ON, the voltage at the drain of transistor T2A is approximately −12 volts. A diode D4A clamps the gate of transistor T3A to the drain of transistor T2A which is at approximately −12 volts. Therefore, the gate of transistor T3A is approximately 0.7 volts greater than the source of transistor T3A and transistor T3A is latched OFF. Thus, transistor T2A and T3A are mutually exclusive.

When transistor T2A is turned ON, transistor T1A is also turned ON. When transistor T2A is turned ON, current travels from output VX through a resistor R2A, diode D2A, and transistor T2A to output VY. When current travels through diode D2A, the voltage at the base of transistor T1A is raised above the voltage at the emitter of transistor T1A and transistor T1A is turned ON. When transistor T1A is turned ON, a 60 mA current travels from the collector of transistor T1A to the emitter of transistor T1A. The 60 mA current through transistor T1A energizes coil CR1F.

When coil CR1F is energized, the contactors associated with coil CR1F are moved. When coil CR1F is energized, contactor CR1D is closed, and connects primary coil T9A between the second terminal of switch S1A and the second terminal of switch of S1B. Also, when coil CR1F is energized, coil CR2F is energized. When coil CR2F is energized, contactor CR2A is closed. Diodes D1A and D6A are flyback diodes for dissipating energy from coils CR2F and CR1F, respectively.

When primary coils T9A and T9B are connected in parallel between the second terminal of switch S1A and the second terminal of switch S1B, power supply 235 produces a positive 24 VDC signal at output VX and a negative 24 VDC signal at output VY. With this arrangement, the turns ratio of transformer 231 is reduced by one half. This configuration of control transformer 231 is performed so that appropriate voltages 20 are provided to other circuits in source 200. Control transformer 231 provides various other circuit elements power in source 200. Although 48 volts is across the network including resistor R5A, diode D5A, and capacitor C2A, transistor T3A remains latched OFF by diode D4A.

When coil CR1F is energized, contactor CR1A is closed and coil CR2F is energized. When coil CR2F is energized, contactor CR2B is closed and contactor CR2C is open. Also, when coil CR2F is energized, contactor CR2E is opened and contactor CR2D and CR2A is closed. When contactor CR2A is closed, primary coil T9B is connected in parallel with coil T9A.

When contactor CR2B and CR2D are closed and contactors CR2C and CR2E are opened, precharge circuit 245 is configured for the lower voltage input. The precharge circuit is engaged until signal 282 provides current to coil W2F. When coil W2F is energized, contactors W2A and W2B are closed. When contactors W2A and W2B are closed, precharge circuit 245 is bypassed.

Also, when coil CR1F is energized, a contactor CR1B is closed and contactor CR1C is opened. Contactor CR1B and CR1C are mutually exclusive. When contactor CR1B is closed and contactor CR1C is open and a signal is provided at conductor 281, coil W2F is energized. When coil W1F is de-energized, contactor W1 remains open. A signal is provided at conductor 281 after a predetermined delay elapses. When coil W2F is energized, contactors W2A and W2B are closed. When contactors W2A and W2B are closed, switching circuits 250A and 250B are connected in parallel for receiving a 230 VAC three-phase signal, a 230 VAC single-phase signal or a 208 VAC single-phase signal.

With reference to FIG. 4, the configurations of switching circuits 250A and 250B and filter circuits 240A and 240B are discussed in more detail as follows. Switching circuits 250A and 250B can be configured for a high voltage input at input 210 or a low voltage input at input 210. The configuration for the low voltage input is for a single-phase 208 VAC signal, a three-phase 230 VAC signal, or a single-phase 230 VAC signal at input 210. Circuits 240A and 240B are configured for a high voltage input when a 460 single-phase VAC signal, or a 460 three-phase VAC signal is coupled to input 210. Switching circuits 250A and 250B are configured for a high voltage input by being disposed serially between the anode of diode D3 and the cathode of diode D6.

Filters 240A and 240B are also configured for the high voltage input or the low voltage input. Similar to switching circuits 250A, and 250B, filters 240A and 240B are disposed either in serial or in parallel to receive a high voltage input or low voltage input, respectively. Filter 240A and switching circuit 250A together form a first tank circuit for converting the DC signal at the cathode of diode D3 to an AC signal at primary coil T1. Filter 240B and switching circuit 250B are also combined to form a second tank circuit for converting the DC signal at the anode of diode D6 to an AC signal at primary coil T5.

Contactors W2A, W2B and W1 interact to couple the first tank to the second tank either serially or in parallel. If coil W2F is energized, contactors W2A and W2B are closed. If contactor W2F is energized, contactor W1F is not energized. Coils W2F and W1F are mutually exclusive. Therefore, if contactors W2A and W2B are closed, contactor W1 is open.

With contactors W2A and W2B closed, the first tank and the second tank are connected in parallel. In other words, when W2B is closed, inductor L2 and capacitor C2 are connected directly to the anode of diode D6. With tanks 1 and 2 in parallel, source 200 is configured for the low voltage input or the single-phase 208 VAC input, or 230 single-phase input. With this arrangement the turns ratio of transformer 270 is 3 to 1 with primary coils T1 and T5 in parallel.

When coil W1F is energized, contactors W2A and W2B remain open, and contactor W1 is closed. With contactor W1 closed, the first tank and the second tank are connected serially. In other words, capacitor C2 is coupled to inductor L2, resistor R3 and inductor L3. Therefore, the voltage from the cathode of diode D2 and the anode of diode D3 is connected across the filter 240A and 240B connected in series and across switching circuits 250A and 250B in series. With the first tank and second tank connected in series, a higher voltage can be applied at the cathode of diode D3 and anode of diode D6 without damaging the circuit components because the voltage is biased across more components. Further, the appropriate voltage is output by transformer 270 because the turns ratio is increased to 6 to 1 with coils T1 and T5 in series.

Precharge circuit 245 is also configured for a high voltage input and a low voltage input. Upon start-up, precharge circuit 245 is configured for a high voltage input.

For the high voltage input, precharge circuit 245 is connected between the second end of inductor L2 and the second end of inductor L3. With this arrangement, precharge circuit 245 provides a resistive path between switching circuits 250A and 250B as well as filters 240A and 240B. Contactors CR2E and CR2C are closed and contactors CR2D and CR2B are opened because coil CR2F is de-energized in the high voltage level configuration.

For the low voltage input, precharge circuit 245 is connected between the second end of inductor L2 and the anode of diode D6 and between the second end of inductor L3 and the cathode of diode D3. With this arrangement, contactors CR2B and CR2D are closed and contactors CR2E and CR2C are opened because coil CR2F is energized in the low voltage level configuration. Thus, two resistive paths are provided for circuits 250A and 250B and filters 240A and 240B.

Figure 7:
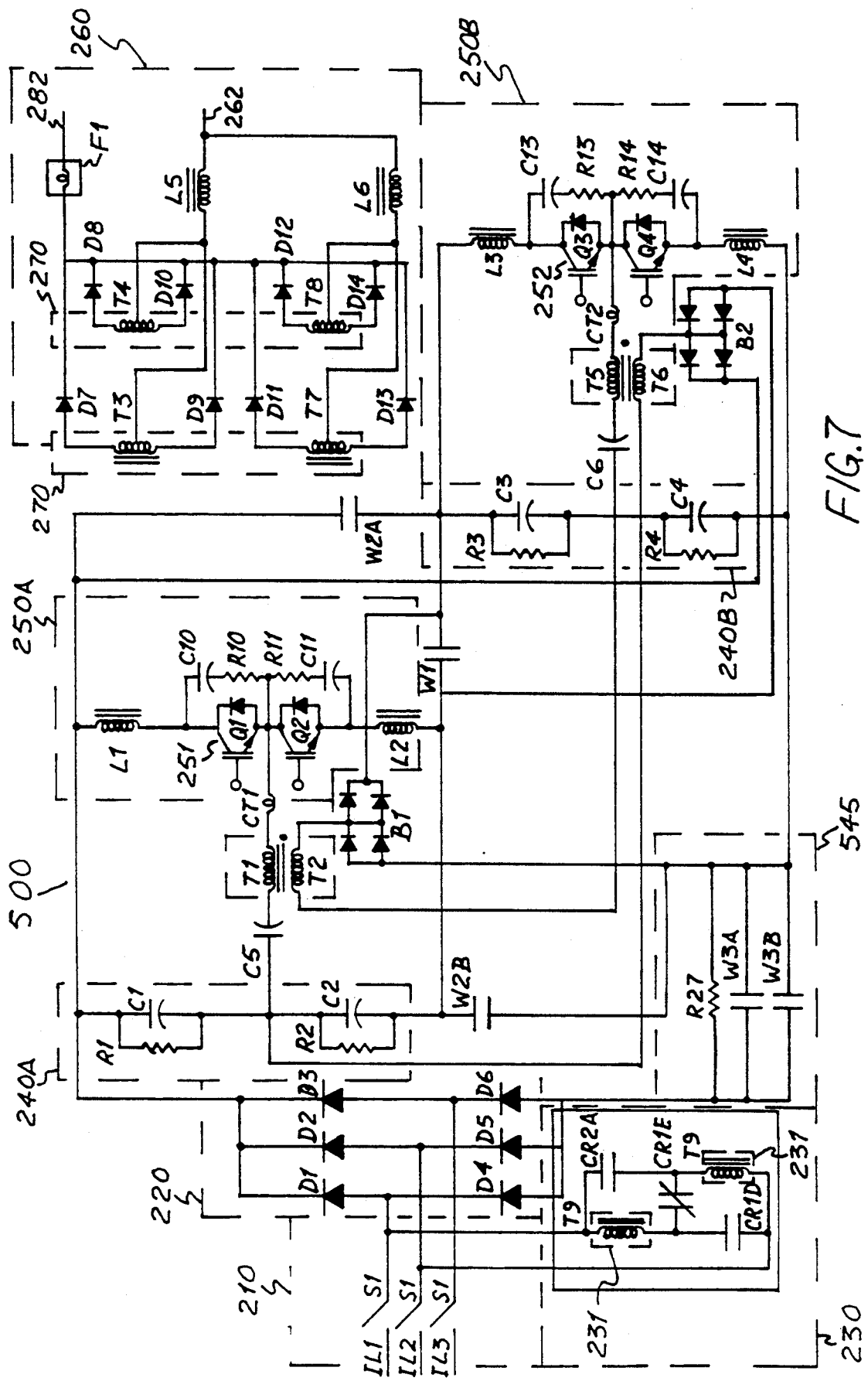
FIG. 7 is another circuit schematic diagram of a power source in accordance with another preferred embodiment of the present invention.
Figure 8:
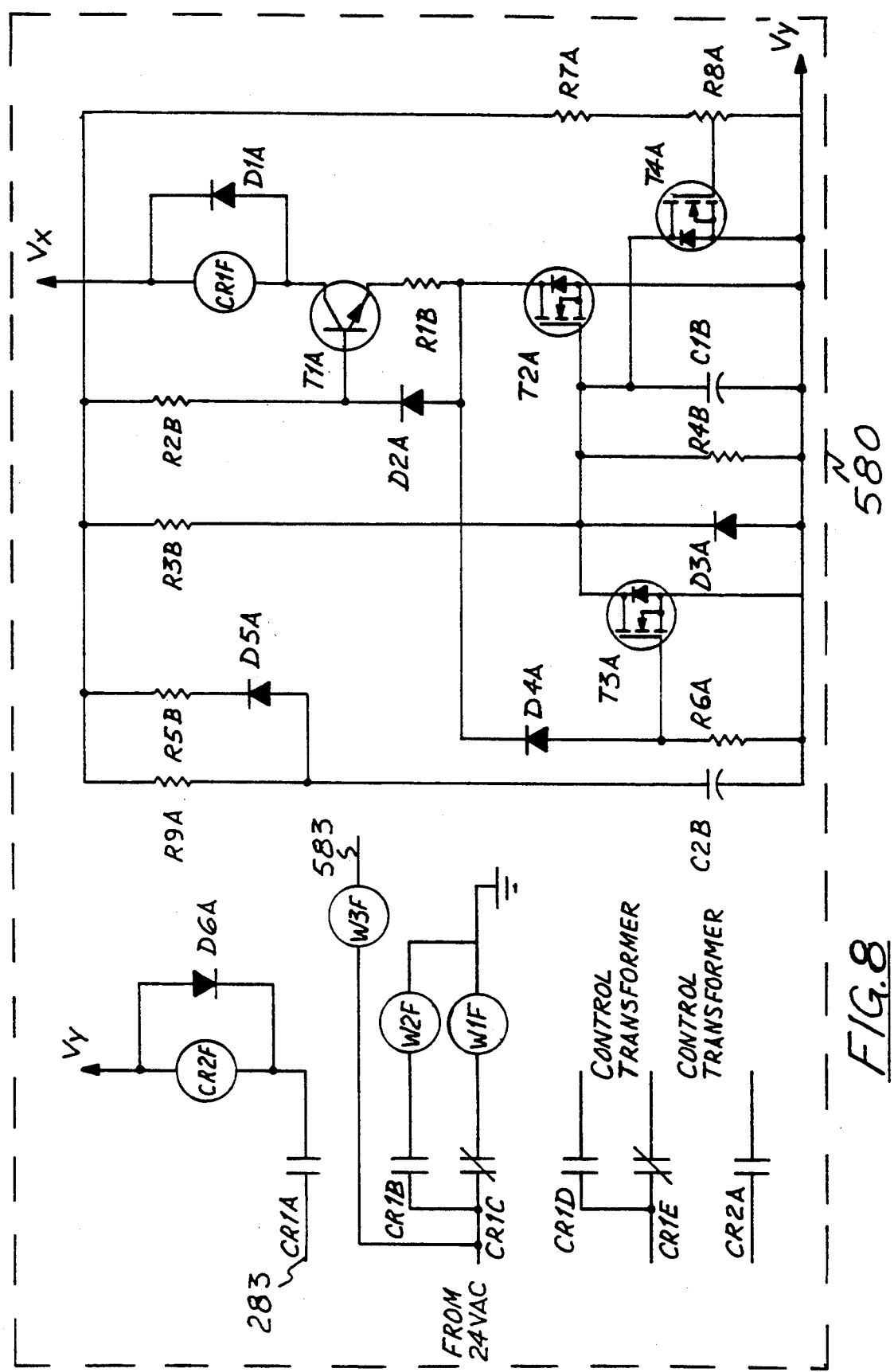
FIG. 8 is another circuit schematic of a power sense circuit in accordance with another preferred embodiment of the present invention.

With reference to FIGS. 7 and 8, an alternative preferred power sense circuit 580 is similar to power sense circuit 280 and an alternative source 500 is similar to source 200. The values for the various components are found in Table 1. Also, certain components have been added to sense circuit 580. Various components of source 200 including contactors have been changed in source 500.

Source 500 and circuit 580 are designed to be less susceptible to contactor problems involving mechanical vibrations and less susceptible to fluctuations in input voltage. Descriptions of the design and operation of source 200 and circuit 280 are generally applicable to source 500 and circuit 580.

Sense circuit 580 operates similarly to sense circuit 280. However, because different component values are used, the various time constants of sense circuit 580 are different than time constants in sense circuit 280. The RC time constant associated with transistor T3A is approximately 2 seconds, and the RC time constant associated with transistor T2A is approximately 1.5 seconds. The components in FIG. 7 and FIG. 5 are similar, wherein like designators indicate like components. The operations of power source 500 are described with reference to FIGS. 4, 5, 7, and 8.

Sense circuit 580 operates similarly to sense circuit 280. However, the time constants associated with transistor T3A and transistor T2A have been increased. The increase in the RC time constant gives supply 500 more time before determining the voltage level at the inputs IL1 and IL2. Longer time constants give power generators connected to source 500 more time to reach operating levels associated with the voltage at inputs IL1 and IL2. This prevents power source 500 and sense circuit 580 from determining the incorrect voltage level when devices such as diesel generators are connected. Diesel generators generally take several seconds before reaching the appropriate AC voltage level at the output of generator.

The circuitry associated with a transistor T4A allows circuit 580 to be configured for the higher voltage level after the lower voltage level has been chosen. As an example, if a 460 VAC diesel generator is coupled to inputs LI1 and LI2, the diesel generator takes a brief period of time to reach the 460 VAC output level. If source 500 is turned ON and then the diesel generator is turned ON, source 500 is immediately configured for the 230 VAC input because the generator has not reached operating voltage. When source 500 is configured for the lower voltage input, transistors T1A and T2A are ON and transistor T3A is latched OFF. As the diesel generator ramps up to the output voltage of 460 volts VAC, the voltage output by control transformer T2B is raised to above 48 volts. In other words, the voltage difference between voltage signal VX and VY is greater than 48 volts.

As this voltage becomes great enough, current traveling through a resistor R7A and a potentiometer R8A raises the voltage at the gate of transistor T4A so that transistor T4A turns ON. Transistor T4A provides a mechanism for turning transistor T2A OFF when the voltage difference between voltage signal VX and VY is greater than approximately 55 volts. When transistor T2A is turned, OFF, transistor T1 is turned OFF and power source 500 is configured for the higher voltage level.

More specifically, when a voltage of greater than 55 volts is across the resistor network including resistor R7A and potentiometer R8A, current travels through resistor R7A and potentiometer R8A and turns transistor T4A ON. Potentiometer R8A is a trim potentiometer used to calibrate the turn ON level of transistor T4A. Potentiometer R8A is generally set after manufacturing of power source 500.

When the potential between voltage signal VY and wiper of potentiometer R8A is great enough, transistor T4A turns ON. When transistor T4A turns ON, the gate of transistor T2A is coupled to voltage signal VY. When the gate of transistor T2A is coupled to the source of transistor T2A, transistor T2A is turned OFF. Thus, when transistor T4A turns ON, the source 500 is configured for the higher voltage level. Circuit 580 is unable to make this adjustment because diode D4A cannot unlatch transistor T3A. Therefore, transistor T4A provides an alternative circuit for turning transistor T2A OFF.

When transistor T4A turns ON, transistor T2A is turned OFF. When transistor T2A is turned OFF, transistor T1A is turned OFF, coil CR1F is de-energized and coil W2 is subsequently de-energized. Also, when coil CR1F is de-energized, coil W1F is energized. When coil W1F is energized, power source 500 is configured for the 460 VAC input.

The time constants for transistor T3A is approximately 4 seconds. The time constant associated with transistor T2A is approximately 1.5 seconds. These time constants provide for a longer start-up time before circuit 580 chooses the input level. Contactor coils CR1F and CR2F operate essentially the same as in circuit 280 to provide the appropriate control of precharge circuit 245 and contactors W2A, W2B and W1.

With reference to FIGS. 7 and 8, a power supply 500 operates similarly to power source 200. Power supply 500 is a version of power source 200 which adjusts to fluctuations at input IL1 and IL2. Further, power supply 500 is less sensitive to vibrations which can cause contactor malfunction. The circuits associated with contactor coils W1F and W2F are modified for this alternative embodiment. Further, various capacitors are added to supply 500 for filtering operations associated with the output of source 500 and bridges B1 and B2. In this preferred embodiment, precharge circuit 545 operates differently than precharge circuit 245.

With reference to FIG. 6, coil W2F and coil W1F are coupled to a 24 VAC voltage signal. Preferably, the 24 VAC signal is provided by a secondary coil of 20 transformer 231. Similar to source 200, coils W2F and W1F are controlled contactors CR1B and CR1C.

Precharge circuit 545 includes a power resistor R27 in parallel with a contactor W3A and a contactor W3B. Contactors W3A and W3B are closed to bypass resistor R27. Thus, when contactors W3A and W3B are closed, the resistance provided by resistor R27 is short-circuited. Precharge circuit 545 is coupled in series with the tank circuits in supply 500.

Preferably the secondary of transformer 231 provides 24 VAC to a coil W3F. Resistors, capacitors and varistors may be employed to provide filtering and a surge protection for coils W1F, W2F, and W3F.

With reference to FIGS. 7 and 8, precharge circuit 545 does not rely on contactors associated with coils CR1F and CR2F. Resistor R27 is directly coupled to circuit 220 and provides a resistive path for power source 500 when power source 500 is precharging. This resistive path is bypassed via contactors W3A and W3B. Contactors W3A and W3B are controlled by coil W3F.

Current is controlled through coil W3F by elements within a control circuit 583 at signal 585 (not shown). Signal 583 goes low after a particular amount of time after start-up. For a welding application, this time delay is approximately four seconds.

After approximately four seconds, voltage signal 583 sinks current from the 24 VAC Signal. Specifically, current travels from the 240 AC Signal through coil W3F and into voltage signal 582. When coil W3F is energized, normally open contactors W3A and W3B are closed, and resistor R27 of precharge circuit 545 is shunted or bypassed.

A path for the network including coil W3F is completed after a particular amount of time after start-up. After the particular amount of time is completed, current is provided through coil W3F. When coil W3F is energized, contactors W3A and W3B are closed and precharge resistor R27 is bypassed. In this embodiment there is not a delay circuit associated with energizing coils W2F and W1F. Coil W1F is immediately energized upon start-up. Coil W2F is energized as soon as circuit 580 determines the lower voltage level. Preferably contractors W1, W2, and W3 are power contractors for use in high voltage applications, and are mounted horizontally with respect to ground to minimize contactor malfunction due to mechanical shock.

In the preferred embodiment, contactors W1, W2, or W3 may be exchanged with semiconductor switches or arrays of semiconductor switches. Semiconductor switches eliminate problems due to vibrations as power supply 500, or source 100, power inverter source circuit 101, or power source 200 is dropped, moved, shaken or experiences mechanical vibration. Mechanical contactors are susceptible to inappropriately opening and closing in response to mechanical vibrations. Semiconductor switches, including SCR's or IBGT's, provide the switching operation without the susceptibility to mechanical vibration. Thus, in a preferred embodiment, contactors W1, W2 and W3 may be replaced with semiconductor switches like silicon controlled rectifiers (SCR's) or other switches not as susceptible to mechanical shock.

It will be understood that while the various conductors/connectors may be detected in the drawings or described in the specification as single lines or conductors, they are not shown or discussed in any limiting way since it may comprise plural conductors/connectors as understood in the art. Further, the above description is of preferred exemplary embodiments of the present invention; the invention is not limited to the specific forms shown. For example, while AC power sense circuit 90 has been shown as a circuit with a transformer and power supplies, it is understood that various sensing device circuits could be substituted. In addition, although relay switches have been shown, various switching devices could have been used including various semi-conductor switching devices. Further, although a series resonant inverter circuit is shown, various inverter circuits may be substituted. Further still, the invention has been described with reference to block diagrams. These function blocks can be combined into the same device or separated into different discrete devices. These and other modifications may be made in the design and arrangement of elements discussed herein without departing from the scope of the invention as expressed in the appended claims.

TABLE I

| | |
|---|---|
| CR1 | 157-93C2L3 manufactured by Midtex 3 pole 24 V DC relay with 2 sets of normally closed contacts and 3 sets of normally opened contacts |
| CR2 | 157-93C2L3 manufactured by Midtex 3 pole 24 V DC relay with 2 sets of normally closed contacts and 3 sets of normally opened contacts |
| F1 | Hall Effect Sensor #LC-300 S/SP2 by LEM Co. |
| R1A | 68 Ohm, 1 Watt |
| R2A | 4.7K, ¼ Watt |
| R3A | 47K, ¼ Watt |
| R4A | 47K, ¼ Watt |
| R5A | 20K, ¼ Watt |
| R6A | 470K, ¼ Watt |
| D1A | 1N4148 |
| D2A | 4.7 V, 1 W zener |
| D3A | 18 V, 1 W zener |
| D4A | 1N4148 |
| D5A | 30 V, 1 W zener |
| D6A | 1N4148 |
| C1A | 10 uF |
| C1B | 1 uF |
| C2A | 1 uF |
| C2B | 10 uF |
| T1A | TIP 47 |
| T2A | IRF 510, MOSFET |
| T3A | IRF 510, MOSFET |
| T4A | IRF 510, MOSFET |
| B1 | FPIR 3260 manufactured by Electronic Devices |
| B2 | FPIR 3260 manufactured by Electronic Devices |
| B3 | KBV8B manufactured by General Instrument |
| D1 | Contained in rectifier module DF60AA160 manufactured by Sannex |
| D2 | Contained in rectifier module DF60AA160 manufactured by Sannex |
| D3 | Contained in rectifier module DF60AA160 manufactured by Sannex |
| D4 | Contained in rectifier module DF60AA160 manufactured by Sannex |
| D5 | Contained in rectifier module DF60AA160 manufactured by Sannex |
| D6 | Contained in rectifier module DF60AA160 manufactured by Sannex |
| D7 | 86HFL60S02 manufactured by International Rectifier |
| D8 | 86HFL60S02 manufactured by International Rectifier |
| D9 | 86HFL60S02 manufactured by International Rectifier |
| D10 | 86HFL60S02 manufactured by International Rectifier |
| D11 | 86HFL60S02 manufactured by International Rectifier |
| D12 | 86HFL60S02 manufactured by International Rectifier |
| D13 | 86HFL60S02 manufactured by International Rectifier |
| D14 | 86HFL60S02 manufactured by International Rectifier |
| S1 | Triple pole, single throw switch |
| R1 | 8K, 30 W |
| R2 | 8K, 30 W |
| R3 | 8K, 30 W |
| R4 | 8K, 30 W |
| R10 | 300 Ohm, 50 W |
| R11 | 300 Ohm, 50 W |
| R12 | 200 Ohm, 25 W |
| R13 | 300 Ohm, 50 W |
| R14 | 300 Ohm, 50 W |
| R15 | 200 Ohm, 25 W |
| L1 | 3.00 uH |
| L2 | 3.00 uH |
| L3 | 3.00 uH |
| L4 | 3.00 uH |
| L5 | 525 mH, 45 A sat |
| L6 | 525 mH, 45 A sat |
| C1 | 4000 uF, 250 VDC |
| C2 | 4000 uF, 250 VDC |
| C3 | 4000 uF, 250 VDC |
| C4 | 4000 uF, 250 VDC |
| C5 | 2.1 uF |
| C6 | 2.1 uF |
| C10 | 4.7 nF, 250 VDC |
| C11 | 4.7 nF, 250 VDC |
| C13 | 4.7 nF, 250 VDC |
| C14 | 4.7 nF, 250 VDC |
| R1B | 68 ohm 1 W |
| R2B | 4.7K, ¼ W |
| R3B | 1.5M, ¼ W |
| R4B | 750K, ¼ W |
| R5B | 3.9K, ¼ W |
| R6B | 750K, ¼ W |
| R7A | 100K. ¼ W |
| R8A | 10K Trimming Potentiometer |
| R9B | 1.5M |
| W1 | 45DA20AJ190 manufactured by Furnas |
| W2 | 45DA20AJ190 manufactured by Furnas |
| W3 | 45DA20AJ190 manufactured by Furnas |
| IGBT 251 | MG75J2Y591 manufactured by Toshiba |
| IGBT 252 | MG75J2Y591 manufactured by Toshiba |
| Transformer 231 | J11179 or J10978 manufactured by Johnson Electric |
| Regulator 232 | LM7815 manufactured by National Semiconductor |
| Regulator 233 | LM7915 manufactured by National Semiconductor |

We claim:
1. A welding power source, comprising:
rectifier means for receiving an AC voltage signal at a voltage level, and providing a DC voltage;
inverter means for receiving the DC voltage and providing an AC voltage output;
output rectifier means for receiving the AC output voltage and providing a DC output voltage;

configuration means for determining the voltage level of the AC voltage signal and configuring the inverter means for the voltage level; and a precharge means for providing a path for the DC voltage to precharge the inverter means.

2. The source of claim 1 wherein the configuration means includes a sense circuit which receives a signal indicative of voltage level and produces a control signal, the control signal effecting the configuration means so that the inverter means is arranged for the voltage level.

3. The source of claim 1 wherein the precharge means is configured for the voltage level.

4. An inverter power supply for use with welding, cutting, or heating apparatus, the power supply comprising:
an AC input;
an AC voltage sense circuit coupled to the AC input, the sense circuit generating a sense signal indicative of a voltage level at the AC input;
a DC rectifier circuit coupled to the AC input, the rectifier circuit producing a DC output;
a switching circuit coupled to the rectifier circuit and receiving the DC output, the switching circuit coupled to the sense circuit and receiving the sense signal, the switching circuit including a first switch circuit receiving power from the DC output, and a second switch circuit receiving power from the DC output, the first switch circuit and second switch circuit being arranged serially or in parallel in response to the sense signal, the first and second switch circuits producing a pulsing output;
a transformer coupled to the switching circuit and receiving the pulsing output and providing a second output;
an output rectifier receiving the second output and providing a power supply output; and
a precharge circuit coupled to the switching circuit, the precharge circuit providing a precharge path in the switching circuit.

5. The power supply of claim 4 wherein the first and second switch circuits include semiconductor devices.

6. The power supply of claim 4 wherein the first and second switch circuits include insulated gate bipolar transistors.

7. The power supply of claim 4 wherein the AC voltage sense circuit comprises a control transformer coupled to the AC input.

8. The power supply of claim 7 wherein an output of the control transformer is coupled to a transistor circuit, and the transistor circuit generates the sense signal.

9. The power supply of claim 4 wherein a first contact bypasses the precharge circuit.

10. The power supply of claim 9 wherein the precharge circuit is comprised of a resistor in series with the DC output and the first contact is in parallel with the resistor.

11. The power supply of claim 4 wherein the precharge circuit is coupled to the AC voltage sense circuit and receives the sense signal; the precharge circuit being configured for the voltage level in response to the sense signal.

12. The power supply of claim 9 wherein the first contact is associated with a coil, and the coil is coupled to receive the sense signal, wherein the coil closes the first contact in response to the sense signal.

13. The power supply of claim 4 wherein the precharge circuit provides a resistive path for precharging at least one capacitor in at least one of the switch circuits.

14. The power supply of claim 4 wherein the precharge circuit is bypassed after a predetermined amount of time.

15. The power supply of claim 4 wherein the first and second switch circuits are arranged via at least one contactor and the sense signal is a current traveling through at least one contactor coil.

16. The power supply of claim 4 wherein the first and second switch circuits are arranged via at least one semiconductor switch and the semiconductor switch is coupled to receive the sense signal.

17. The power supply of claim 14 wherein the first and second switch circuits are arranged via a semiconductor switch.

18. The power supply of claim 15 wherein the at least one contactor is arranged horizontally.

19. A welding power source, comprising:
a rectifier coupled to receive an AC voltage and providing a DC voltage, the AC voltage being one of a plurality of voltage levels;
a power switching circuit coupled to the rectifier, the power switching circuit providing an AC signal, the power switching circuit including a first inverter circuit and a second inverter circuit, the first inverter circuit and second inverter circuit being coupled in series in response to a first predetermined voltage level of the AC voltage or in parallel in response to a second predetermined voltage level of the AC voltage;
a precharge circuit coupled to the power switching circuit, the precharge circuit providing a precharge path in the power switching circuit; and
an output rectifier that receives the AC signal and provides a DC output.

20. The power source of claim 19 wherein the first inverter circuit and the second inverter circuit are coupled to each other via switches.

21. The power source of claim 19 wherein the first and second inverter circuits are connected in series or parallel in response to a control signal from a voltage sense circuit.

22. The power source of claim 20 wherein the switches are relay contacts.

23. The power source of claim 21 wherein the control signal is applied to relays coupled with the power switching circuit, the relays connecting the first inverter circuit and second inverter circuit serially or in parallel in response to the control signal.

24. A welding power supply for supplying a power supply output signal for use in a welding apparatus, the power supply comprising:
a three-phase AC input;
an AC voltage sense circuit coupled to at least two phases of the three-phase AC input, the sense circuit including a transformer coupled to at least one contactor coil, the AC sense circuit energizing the at least one contactor coil in response to one of a plurality of voltage levels at the three-phase AC input;
a DC rectifier circuit coupled to the three-phase AC input, the rectifier circuit providing a DC output;
a switching circuit coupled to the rectifier circuit and receiving the DC output, the switching circuit including at least one contactor electromagnetically coupled to the coil, the switching circuit including a first semiconductor switch circuit and a second semiconductor switch circuit, the first semiconductor switch circuit and the second semiconductor switch circuit being arranged serially or in parallel in response to the energizing of the at least one coil, the first and second semiconductor switch circuits producing a pulsing output, the switching circuit including a precharge circuit, the precharge circuit including a current limiting device;

a transformer coupled to the switching circuit and receiving the pulsing output and providing a second pulsing output; and an output rectifier receiving the second pulsing output and providing the power supply output.

25. The power supply of claim 24 wherein the precharge circuit further includes at least one contactor coupled across the current limiting device.

26. The welding power supply of claim 25 wherein the current limiting device is a resistor.

27. The welding power supply of claim 24 wherein the AC voltage sense circuit is coupled to only two phases of the three phase input.

28. The welding power supply of claim 26 wherein the AC sense circuit includes a second coil associated with the at least one precharge contact and wherein the first and second semiconductor switch circuits each include an IGBT.

29. The welding power source of claim 1 wherein the configuration means continually monitors the AC voltage signal and reconfigures the inverter means when the AC voltage signal changes from a first of a plurality of voltage levels to a different voltage level.

* * * * *

UNITED STATES PATENT AND TRADEMARK OFFICE
CERTIFICATE OF CORRECTION

PATENT NO. : 5,319,533
DATED : June 7, 1994
INVENTOR(S) : Jon O. Reynolds
Albert M. Nowak It is certified that error appears in the above-indentified patent and that said Letters Patent is hereby corrected as shown below:

In the drawings in Figure 5, sheet 5, diodes D2A, D3A, and D5A should be schematically represented as zener diodes.

In the drawings in Figure 8, sheet 8, diodes D2A, D3A, and D5A should be schematically represented as zener diodes.

In the drawings in Figure 8, sheet 8, the gate of transistor T3A should be coupled to the anode of diode D5A.

In the drawings in Figure 5, sheet 5, the gate of transistor T3A should be coupled to the anode of diode D5A.

In the drawings in Figure 8, sheet 8, potentiometer R8A should include an arrow coupled to the gate of transformer T4A. The arrow symbolizes the wiper of potentiometer R8A.

column 4, line 8, change "91" to --90--.

UNITED STATES PATENT AND TRADEMARK OFFICE
CERTIFICATE OF CORRECTION

PATENT NO. : 5,319,533
DATED : June 7, 1994
INVENTOR(S) : Jon O. Reynolds
Albert M. Nowak It is certified that error appears in the above-indentified patent and that said Letters Patent is hereby corrected as shown below:

column 3, line 53, after "signal", insert --,--.

column 3, line 57, after "signal", insert --,--.

column 6, line 19, after "circuit 21," delete "an" and insert --a--.

Signed and Sealed this

Thirteenth Day of June, 1995

Attest:

BRUCE LEHMAN

Attesting Officer

Commissioner of Patents and Trademarks